Figure 1:
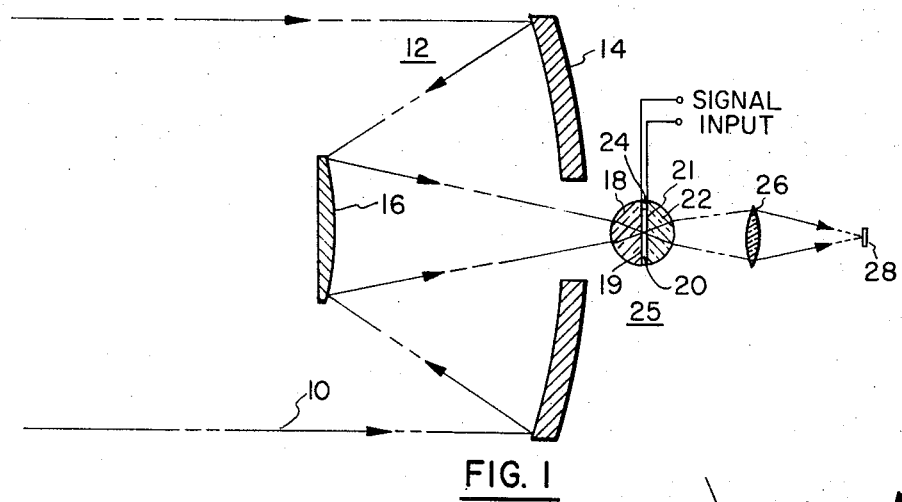

Feb. 13, 1968 G. FALBEL 3,369,120
CONVERGENT RADIATION MODULATION SYSTEM
Filed Feb. 14, 1964

INVENTOR.
GERALD FALBEL
BY Joseph Levinson
ATTORNEY

United States Patent Office 3,369,120
Patented Feb. 13, 1968

3,369,120
CONVERGENT RADIATION MODULATION SYSTEM
Gerald Falbel, Stamford, Conn., assignor to Barnes Engineering Company, Stamford, Conn., a corporation of Delaware
Filed Feb. 14, 1964, Ser. No. 344,999
12 Claims. (Cl. 250—83.3)

This invention relates to the optical modulation of electromagnetic radiation, and more particularly to a convergent radiation modulation system utilizing the principles of frustrated internal reflection.

In measuring electromagnetic radiation, it is common practice to modulate the radiation before it strikes a radiation detector, thereby producing an AC output signal instead of a DC signal. The AC output signal allows the use of AC amplifiers, which are more stable and less difficult to construct and operate, and accordingly are more economical than DC amplifiers. Furthermore, there is no drift in the AC system, as is the case with the DC amplification system. Large magnitude amplification is normally required of the signals from a radiation detector due to the weak nature of the signals applied to the detector. Other advantages of the AC amplification include the possibility of discriminating against unmodulated spurious radiation within the field of view of the detector and discrimination against a portion of the inherent detector noise.

The most common means employed to modulate or chop radiation incident on a radiation detector is to interpose between the field of view of the detector and the detector a motor-driven wheel which contains alternate sections which are opaque and transparent to the radiation being measured. The modulation or chopping frequency is determined by the number of sectors or blades in the chopper wheel and its speed of rotation. Mechanical choppers of this nature have drawbacks with respect to weight, size, and power requirements. Furthermore, in such uses as space applications there are maintenance problems such as bearing lubrication which limit the workable life of the modulator.

An optical modulation system dealing with these problems is disclosed in an application entitled "A Frustrated Internal Reflection Modulator and a Method of Making the Same," Ser. No. 330,039, filed Dec. 12, 1963, by R. W. Astheimer, now U.S. Patent No. 3,338,656. The present invention deals with the same problems utilizing a frustrated internal reflection modulation device, but in this instance one which chops convergent radiation. Optical means are provided for converging radiation to a focal plane, and at least an element of the optical modulator forms a part of the convergent means with the modulator being located in proximity to the focal plane of the optical system. This provides the distinct advantage of allowing radiation to be chopped at its narrowest point, thereby allowing the use of small optical modulator elements. In a more specific embodiment, the modulator comprises an immersed thermistor bolometer which is modified in accordance with this invention to be a self-chopping detector.

Accordingly, it is an object of this invention to provide a convergent radiation modulation system which allows the use of small elements whereby optical chopping may be accomplished in optical systems which, because of size or spacing, would make unfeasible the use of mechanical-type choppers.

Another object of this invention is to provide a convergent radiation modulation system which is small in size, light in weight, and has low power requirements.

A further object of this invention is to provide a convergent radiation modulation system which has a long operating life and is not subject to the maintenance problems associated with comparable mechanical-type choppers.

Still another object of this invention is to provide a new and improved convergent radiation modulation system in which an immersed detector is incorporated in the system and forms a part of the modulator, thereby reducing the number of elements required in the system.

A further object of this invention is to provide a self-chopping detector.

Figure 2:
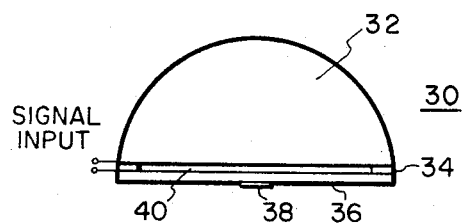
Figure 3:
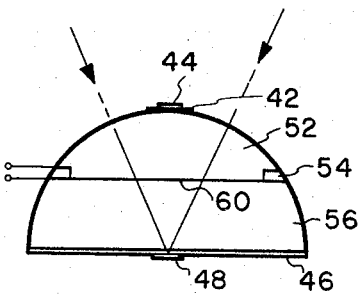
Figure 4:
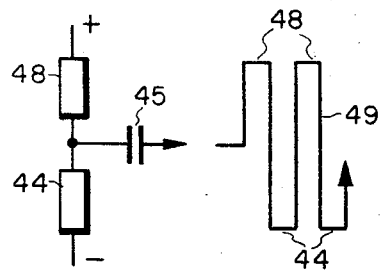
Figure 5:
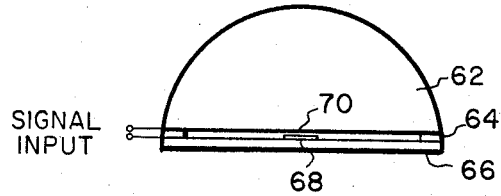
Figure 6:
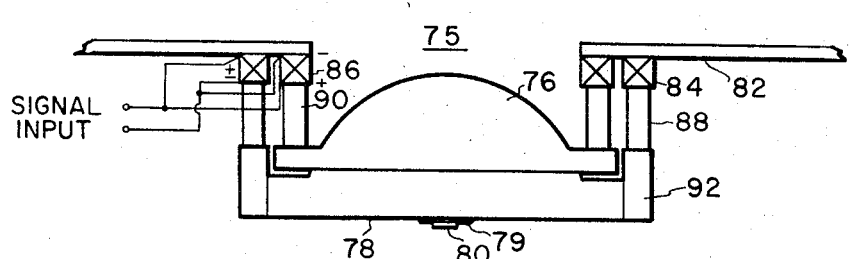

The invention, both as to its organization and method of operation, together with further objects and advantages thereof, may best be understood from the following description taken in connection with the accompanying drawings, in which:

FIG. 1 is a schematic diagram of the convergent radiation modulation system embodied in this invention, FIG. 2 is a plan view of one form of self-chopping detector embodied in this invention, FIG. 3 is a plan view of another embodiment of the self-chopping detector in accordance with this invention, FIG. 4 is an electrical schematic diagram of the circuit connections for the detector shown in FIG. 3 and a waveform produced thereby, FIG. 5 shows another form of the self-chopping detector in accordance with the present invention, and FIG. 6 shows another embodiment of the self-chopping detector in accordance with this invention.

Referring now to FIG. 1, the convergent radiation modulation system as embodied in this invention includes an optical means 12, an optical radiation modulating means 25, an objective 26, and a radiation detector 28. The optical means 12 is illustrated as a reflective telescope of the Cassegrain type, in which incoming radiation 10 is reflected from a primary mirror 14 having a central opening therein and reflected to a secondary mirror 16 which reflects the radiation through the central opening in the primary 14. The use of the reflective Cassegrain type telescope is useful, since mirrors uniformly reflect radiation from ultraviolet through the far infrared, while lens-type optical systems do not transmit equally at all wavelengths. However, the invention is not restricted to reflecting-type optical systems, and the type of optical system used will depend primarily on the application in which the system is utilized. The optical means 12 converges radiation on the optical radiation modulating means 25. The optical radiation modulating means 25 includes a first refracting element or lens 18 having an optically flat surface 19 on one side thereof, which is separated by an electrical transducer 24 from an optically flat surface 21 of a second refracting element or lens 22 with the surfaces 19 and 21 forming an interface 20 therebetween. The curved or front surface of the lens 18 forms a part of the optical means 12 for converging radiation on the interface 20 between the two refracting elements 18 and 22. The geometric configuration of the lens 18 is set by the optical requirements, which include that the lens 18 be a convergent element and that the incident radiation on the front face of the lens 18 be incident at less than the critical angle and that the radiation falling on the internal optically flat surface 19 be greater than the critical angle so that total internal reflection may take place. A number of different materials may be used for the lens, requiring different configurations of the lens to satisfy these requirements. The second refracting element or lens 22 must have an optically flat surface 21 which is parallel to the optically flat surface 19 of the first refracting element 18.

In order to explain the optical modulation which takes place, assume that the lens 22 is removed, and that the radiation falling on the front surface of the lens 18 is incident at less than the critical angle and therefore refracted to fall on the optically flat surface 19. Radiation falling on the optically flat surface 19 which exceeds the critical angle is totally reflected therefrom. Now, by placing the optically flat surface 21 of lens 22 close by and parallel to the surface 19 of lens 18, a portion of the radiation will penetrate the gap or interface 20, thereby frustrating total reflection from the surface 19. The amount of transmission or penetration of the gap 20 is a function of the gap width, and will be maximum for total transmission when the two inclined surfaces 19 and 21, which form the interface 20, are in intimate contact, but will decrease considerably as the gap or interface 20 opens to a few wavelengths of the incident radiation. This effect provides a means for strongly modulating a sizeable aperture as provided by the optical means 12 with very small motions.

The aforesaid small motions are provided by an electrical transducer 24 which is positioned annularly or on the outer extremities of the lens elements 18 and 22. The transducer 24 must be able to produce small, accurate displacements between the first and second refracting elements to produce frustrated internal reflection, and thus modulate the radiation applied to the device 25. The preferred form of transducer 24 is a piezo-electric device such as barium titanate, although any transducer capable of producing small, accurate motions such as magnetostrictive devices or electrodynamic transducers may be utilized depending on the particular application. A piezo-electric device such as barium titanate allows the utilization of a stack of elements to reduce voltage requirements in providing small, accurate displacements by a small transducer which dissipates and requires very little power. By applying electrical signals to the piezo-electric transducer 24, the gap 20 is changed, thereby changing the amount of transmission, or modulating the radiation applied thereto, utilizing the principles of frustrated internal reflection.

Divergent radiation transmitted through the lens element 22 is focused by an objective 26 on a radiation detector 28. The type of detector used, such as thermal or photodetector, will depend on the application, although in later embodiments thermistor bolometers are referred to for purposes of illustration because of their advantage in the configuration shown for some applications.

A particularly useful advantage of the convergent radiation modulation system as embodied in this invention resides in the fact that the modulation or chopping is accomplished where the radiation beam is the smallest. The modulator 25 is located with its interface 20 in proximity to the focal plane of the optical means 12. Therefore, smaller elements may be utilized to chop or modulate the radiation. This is particularly advantageous where the design of the optical system or the equipment in which such a system is incorporated would not allow, because of size or other mechanical considerations, the insertion of large mechanical-type choppers. Furthermore, it allows the use of small elements for the modulator 25, reducing the cost of such modulators. Then, too, the lens 18 performs the useful function of being a part of the convergence means of the optical system, thereby performing the dual function of converging and chopping the incident radiation. It should be noted that the optical modulator 25 modulates only the convergent radiation which is incident on the interface 20 at an angle exceeding critical. Therefore, a portion of the radiation being applied which does not exceed critical, which would be incident on the first refracting element 18 in a central portion thereof, will not be modulated. This factor does not render the modulator impractical, due to the small percentage of radiation that will appear in this area, and particularly when the optical means comprises a Cassegrain-type telescope, since a large percentage of the radiation which would not be modulated is obscured by the secondary mirror 16. At any rate, even with a lens-type optical system, there is some central obscuration, and the device is not rendered impractical by the use of transmission-type systems as distinguished from reflective-type optical systems.

A logical extension of the convergent radiation modulation system utilizing frustrated internal reflection, as described above, is its use in an immersed thermistor bolometer, thus making a self-chopping detector. Immersed thermistor bolometers utilize thermistors, which are heat-sensitive resistors exhibiting large changes of resistance with temperature. The thermistors are formed in small, thin flakes which are mounted on a lens of infrared-transparent material which also has high thermal conductivity for fast response to changes in radiation. The lens serves the dual function of increasing the intensity of the infrared radiation falling on the thermistor flakes, and also acts as a thermal heat-sink for the device. FIG. 2 shows one embodiment of a self-chopping detector utilizing frustrated internal reflection. The self-chopping detector 30 includes an immerision button or lens which has been split into two parts, 32 and 36. The two lens pieces 32 and 36 are separated by an interface 40 which is controlled by the piezo-electric transducer 34. A radiation detector 38 is mounted on the lower lens 36. When the interface 40 is closed, such that the plane parallel surfaces of the lenses 32 and 36 are abutting, radiation from a field of view which may be directed thereon by optical means such as that shown in FIG. 1, or other suitable optical means, is directed to the radiation detector 38. As the interface 40 opens in response to electrical signals applied to the piezo-electric transducer 34, progressively less radiation is provided to the detector 38, until total internal reflection takes place from the flat surface of the element 32. As the interface is closed, the total internal reflection is frustrated, with part of the energy getting to the detector 32, which in effect modulates or chops the radiation being applied to the detector 38. If the refractive lenses 32 and 36 are electrical conductors such as germanium or silicon, the thermistor flake must be insulated therefrom, and would normally be mounted thereon using a thin film of insulating material such as selenium.

Conventionally, thermistor bolometers are constructed using a closely matched pair of flakes, in which one flake is the active flake, or the one heated by incident radiation, and the compensating flake is shielded, such that its resistance is unaffected by source radiation. The flakes are normally connected oppositely biased in a bridge circuit, with the output voltage taken at the junction of the two flakes. In the configuration shown in FIG. 3, the immersion lens is separated into two halves, 52 and 56. An interface 60 is formed between the two lens halves 52 and 56, which is controlled by a piezo-electric transducer 54. The normally passive, or compensating flake 44 referred to above is mounted on the top half of lens 52 on an insulating film 42, and the active flake 48 is mounted to the lower lens 56 on a thin insulating film 46. The flakes 44 and 48 are connected into an active-active bridge circuit as shown in FIG. 4. When the lens halves 52 and 56 are abutting, forming a closed interface 60, the bottom flake views the source radiation being converged thereon from a field of view. The upper flake 44 views the bottom flake and its surroundings. This is the condition shown in FIG. 3. When an electrical signal is applied to the transducer 54 and the lenses 52 and 56 are separated, thereby opening up the interface 60, the upper flake 44 receives radiation from the source that make an angle greater than the critical angle for total internal reflection from the interface surface 60. The bottom flake 48 receives its radiation from its surroundings by reflection from the upper surface of lens 56. As has already been pointed out, only the outer annulus of the convergent beam is effectively chopped, since the convergent radiation hitting the interface must exceed the critical angle for total internal reflection. As in the previous case, this is of little consequence, since the inner portions of the convergent beam are in most cases obscured due to the presence of the upper flake 44 and secondly, this is the obscured portion in most Cassegrain-type optical systems such as shown in FIG. 1, which might normally be used for directing radiation from a field of view onto the detector.

The thermistor flakes 48 and 44 are connected in series and biased oppositely, as shown in the active-active bridge configuration of FIG. 4, with their outputs being taken through a capacitor 45 from their junction. The output waveform 49 is also shown. An advantage is obtained in this configuration over the conventional active-compensating bridge which provides only half the output of the configuration shown in FIG. 4. Full wave rectification of the waveform 49 produces a 2:1 increase in signal-to-noise ratio over a similar active-compensating bridge. No noise has been added, and an active flake is always viewing the source of radiation, which increases the peak-to-peak signal by a factor of 2. In the conventional arrangement, the active flake is periodically blocked from the source of radiation.

FIG. 5 shows another configuration in which the immersion lens is divided into two pieces, 62 and 66, separated by a piezo-electric transducer 64. In this configuration the detector 68 is mounted on the upper surface of lens half 66, so that the flake and the lens 62 form an interface 70 therebetween. In this configuration the detector, when moved, comes into close proximity to the lens half 62 but does not touch it. If contact is made with the detector, a thin insulating layer of infrared transmitting material would be required to prevent the detector from shorting out if the lens 62 is conductive, which would be the case if it were germanium. The configuration of FIG. 5 is more difficult to construct than the other configurations. Since care must be exercised in not damaging the detector, the spacing and tolerances would be more critical. Thermocouples and thermopiles are preferred in this embodiment because they do not require bias as in the case of thermistors. Thermistor bias and the voltage applied to the transducer 64 might provide a capacitance problem which would be difficult to overcome. The thermocouple would not suffer this impairment.

Thermal expansion of the material used in fabricating the convergent modulation system may become a problem in applications where wide variations in ambient temperature occur. For example, thermal expansion of the transducer due to ambient temperature might produce a change in gap width without applied voltage change. One way to overcome the problem is to fabricate the modulator using materials with similar coefficients of expansion. This not always being possible for given applications, one way of overcoming the problem is shown in FIG. 6. The modulator portion of this device is similar to the construction shown in FIG. 2 with the modulator 75 having lens halves 76 and 78 with a detector 80 mounted on a thin film of insulating material 79 on the lens half 78. However, in this configuration the piezo-electric transducer is divided into annular stacks 84 and 86. The piezo-electric stacks 84 and 86 are mounted on an annular support base 82 of Invar or other suitable material. The piezo-electric stack 86 drives the lens 76 through an expansion ring 90, while the piezo-electric stack 84 drives the lens 78 through an expansion ring 88 and an annular linkage 92. The annular linkage 92 is fabricated of the same material as the lens; therefore, if the lens is germanium the annular linkage 92 is also made of germanium. The piezo-electric stack is biased oppositely to provide a "push-pull" arrangement.

The radiation chopping system and self-chopping detectors disclosed in this invention are particularly useful for the chopping and measurement of infrared radiation, but are not restricted thereto. However, the use of shorter wavelengths would require more critical spacing and tolerances, and thus would be more difficult to carry out.

The convergent radiation modulation system embodied in this invention provides a relatively long-life, maintenance-free radiation chopping system. Since the radiation is converging to a focal plane, the spacing of the optical chopping system in proximity to this focal plane chops the incoming radiation at its most confined area, reducing the size of the already small optical modulation device. The incorporation in the convergent modulation system of an immersed detector saves parts and space, and provides for radiation measurement in a most efficient manner. The use of the self-chopping detector is particularly desirable in instrumentation design where size and space requirements are critical.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What I claim as new and desire to secure by Letters Patent is:

1. A convergent radiation modulation system comprising
  (a) optical means for converging radiation to a focal plane,
  (b) a frustrated internal reflection optical radiation modulating means in optical alignment with and positioned in proximity to the focal plane of said optical means having first and second refracting elements separated by an interface formed by parallel optically flat surfaces from each of said first and second refracting elements with the amount of radiation transmitted through said interface being dependent upon the separation between said parallel optically flat surfaces,
  (c) said first refracting element forming a part of said optical means and being a convergent element of a geometric configuration for passing and applying at least a portion of the radiation of said optical means to said interface at greater than the critical angle so that total internal reflection may take place at said interface when said parallel optically flat surfaces are sufficiently separated, and
  (d) electrical means responsive to electrical signals for controlling the separation between said parallel optically flat surfaces and therefore said interface for controlling by frustrated internal reflection at said interface the radiation passing through said frustrated internal reflection optical radiation modulating means.

2. The system set forth in claim 1 wherein said first and second refracting elements are parts of an immersed detector with a detector being mounted on said second refracting element.

3. The structure set forth in claim 1 wherein electrical means comprises at least two piezo-electric devices and means linking said piezo-electric devices and said two refracting elements whereby each device drives a different refracting element.

4. The system set forth in claim 2 wherein said detector is mounted on the upper portion of said second refracting element.

5. The structure set forth in claim 2 wherein said detector is mounted on the lower surface of said second refracting element.

6. The system set forth in claim 1 wherein said first and second refracting elements comprise an immersion lens which is divided into two pieces, with said interface being formed by the two pieces, and a detector mounted on at least one of said pieces.

7. The structure set forth in claim 6 wherein said electrical means comprises at least two piezo-electric devices and means for linking each said piezo-electric devices with one of said pieces whereby each device drives a different piece of the immersion lens.

8. The structure set forth in claim 6 wherein a first detector is mounted on top of one piece and a second detector is mounted on the bottom of the other piece.

9. The structure set forth in claim 8 wherein said detectors are serially connected, biased oppositely, and the output therefrom is taken from their connecting point with said modulator directing radiation to one or the other of said detectors.

10. A radiation modulation system comprising:
(a) an optical radiation modulation means having first and second refracting elements separated by an interface formed by parallel surfaces from each of said refracting elements,
(b) separate piezo-electric drive means coupled to each of said first and second refracting elements, and
(c) means for driving said piezo-electric drive means in push-pull for controlling the separation between said parallel surfaces, and therefore said interface, for controlling by frustrated internal reflection at said interface radiation applied to said optical radiation modulating means.

11. The structure set forth in claim 10 wherein said piezo-electric drive means comprises concentric cylinders of piezo-electric material.

12. The structure set forth in claim 11 wherein said concentric piezo-electric drive means are of equal length and the material coupling one of said piezo-electric devices to one of said reflecting elements is of the same material as said refracting element.

References Cited
UNITED STATES PATENTS

| | | | |
|---|---|---|---|
| 2,455,763 | 12/1948 | Harrison | 88—61 |
| 2,565,514 | 8/1951 | Pajes | 88—61 |
| 2,983,823 | 5/1961 | Oberly | 250—83.3 X |
| 2,997,922 | 8/1961 | Kaprelian | 88—61 |
| 2,999,161 | 9/1961 | Lovoff | 250—83.3 |
| 3,059,113 | 10/1962 | McHenry | 250—83 |
| 3,183,359 | 5/1965 | White | 331—94.5 X |
| 3,246,159 | 4/1966 | Pankove | 88—61 X |

ARCHIE R. BORCHELT, *Primary Examiner.*